United States Patent
Cho

(10) Patent No.: US 8,928,619 B1
(45) Date of Patent: Jan. 6, 2015

(54) FLEXIBLE TOUCH SENSITIVE DISPLAY DEVICE AND CONTROL METHOD THEREOF

(71) Applicant: LG Electronics Inc., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/314,747

(22) Filed: Jun. 25, 2014

(30) Foreign Application Priority Data

Apr. 15, 2014 (KR) .................. 10-2014-0044700

(51) Int. Cl.
*G06F 3/041* (2006.01)
(52) U.S. Cl.
CPC ...... *G06F 3/041* (2013.01); *G06F 2203/04102* (2013.01)
USPC ............................ 345/173; 345/174; 715/863
(58) Field of Classification Search
CPC ... G06F 1/1652; G06F 3/0414; G06F 1/1626; G06F 2203/04102; H04M 1/0268; G09G 2380/02
USPC .......... 345/104, 156, 169, 173, 174; 715/702, 715/863, 864
See application file for complete search history.

(56) References Cited

U.S. PATENT DOCUMENTS

| | | | |
|---|---|---|---|
| 6,028,595 A * | 2/2000 | Shiga ........................... | 345/173 |
| 7,109,967 B2 | 9/2006 | Hioki et al. | |
| 7,433,179 B2 * | 10/2008 | Hisano et al. ............ | 361/679.27 |
| 7,443,380 B2 | 10/2008 | Nozawa | |
| 7,880,718 B2 | 2/2011 | Cradick et al. | |
| 8,587,539 B2 | 11/2013 | Tziortzis et al. | |
| 2004/0008191 A1 | 1/2004 | Poupyrev et al. | |
| 2006/0227114 A1 | 10/2006 | Geaghan et al. | |
| 2008/0303782 A1 | 12/2008 | Grant et al. | |
| 2009/0219247 A1 | 9/2009 | Watanabe | |
| 2010/0011291 A1 | 1/2010 | Nurmi | |
| 2010/0117975 A1 | 5/2010 | Cho | |
| 2010/0141605 A1 | 6/2010 | Kang et al. | |
| 2011/0057873 A1 | 3/2011 | Geissler et al. | |
| 2012/0092363 A1 * | 4/2012 | Kim et al. ..................... | 345/618 |
| 2012/0112994 A1 | 5/2012 | Vertegaal et al. | |
| 2012/0169609 A1 | 7/2012 | Britton | |
| 2013/0044240 A1 | 2/2013 | Leskela et al. | |
| 2013/0127606 A1 | 5/2013 | Chang | |
| 2013/0135182 A1 | 5/2013 | Jung et al. | |
| 2013/0145311 A1 | 6/2013 | Joo | |
| 2013/0201115 A1 | 8/2013 | Heubel | |
| 2013/0257775 A1 * | 10/2013 | Lee .............................. | 345/173 |
| 2014/0002402 A1 | 1/2014 | Kang et al. | |
| 2014/0035869 A1 | 2/2014 | Yun et al. | |
| 2014/0062976 A1 | 3/2014 | Park et al. | |
| 2014/0068473 A1 | 3/2014 | Jano et al. | |

* cited by examiner

*Primary Examiner* — Koosha Sharifi-Tafreshi
(74) *Attorney, Agent, or Firm* — Birch, Stewart, Kolasch & Birch, LLP

(57) ABSTRACT

Disclosed is a control method of a flexible display device, the method including sensing a state of the flexible display device, detecting touch input at a first position of the flexible display device, correcting position information, regarding the touch input detected at the first position, to a second position when the flexible display device is in a flat state, and correcting position information, regarding the touch input detected at the first position, to a third position when the flexible display device is in a first bent state, a distance between the first position and the third position being less than a distance between the first position and the second position.

20 Claims, 8 Drawing Sheets

FLEXIBLE TOUCH SENSITIVE DISPLAY DEVICE AND CONTROL METHOD THEREOF

Pursuant to 35 U.S.C. §119(a), this application claims the benefit of Korean Patent Application No. 10-2014-0044700 filed on Apr. 15, 2014, which is hereby incorporated by reference as if fully set forth herein.

BACKGROUND OF THE INVENTION

1. Field of the Invention

The present specification relates to a flexible display device, and more particularly to a flexible display device, which functions to correct position information regarding touch input, and a control method thereof.

2. Discussion of the Related Art

A flexible display device may display the same resolution of image even when folded or bent. Accordingly, a user may minimize the volume of the flexible display device and achieve convenience in carriage by rolling the flexible display device. In addition, even in an unfolded or spread state thereof, the flexible display device may advantageously provide the user with a screen having one of various sizes and angles via bending thereof.

However, in the case of the flexible display device, upon detection of user touch input, there may occur a difference between a position the user wishes to touch and a position where the touch input is actually detected according to a bending angle of the flexible display device. Therefore, the flexible display device may need to correct position information regarding the detected touch input.

SUMMARY OF THE INVENTION

Accordingly, the present specification is directed to a flexible display device and a control method thereof that substantially obviate one or more problems due to limitations and disadvantages of the related art.

More particularly, an object of the present specification is to provide a method for detecting touch input to a flexible display device and correcting position information regarding the detected touch input.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with one embodiment of the specification, as embodied and broadly described herein, a flexible display device includes a flexible display unit having a flat state and a bent state, a touch sensor unit configured to sense touch input, a bending sensor unit configured to sense a bending angle of the flexible display unit, and a controller configured to control the flexible display unit, the touch sensor unit, and the bending sensor unit, wherein the controller corrects position information, regarding the touch input detected at a first position of the flexible display unit, to a second position when the flexible display unit is in the flat state, wherein the controller corrects position information, regarding the touch input detected at the first position, to a third position when the flexible display unit is in a first bent state, and wherein a distance between the first position and the third position is less than a distance between the first position and the second position.

In accordance with another embodiment of the present specification, a control method of a flexible display device, includes sensing a state of the flexible display device, detecting touch input at a first position of the flexible display device, correcting position information, regarding the touch input detected at the first position, to a second position when the flexible display device is in a flat state, and correcting position information, regarding the touch input detected at the first position, to a third position when the flexible display device is in a first bent state, wherein a distance between the first position and the third position is less than a distance between the first position and the second position.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Hereinafter, various embodiments will be described in detail with reference to the attached drawings and illustrations thereof, but it should be understood that the present specification is not restricted or limited by the embodiments that will be described hereinafter.

Although the terms used in the following description are selected, as much as possible, from general terms that are widely used at present while taking into consideration the functions obtained in accordance with the present specification, these terms may be replaced by other terms based on intensions of those skilled in the art, customs, emergence of new technologies, or the like. Also, in a particular case, terms that are arbitrarily selected by the applicant of the present specification may be used. In this case, the meanings of these terms may be described in corresponding description parts of the specification. Accordingly, it should be noted that the terms used herein should be construed based on practical meanings thereof and the whole content of this specification, rather than being simply construed based on names of the terms.

In the following description, a flexible display device may mean a display device whose shape is changeable by a user. That is, examples of the flexible display device may include electronic paper, a foldable display device, and a rollable display device. Although the flexible display device will be described below by way of example, the embodiments of the present specification are not limited thereto.

Figure 1:
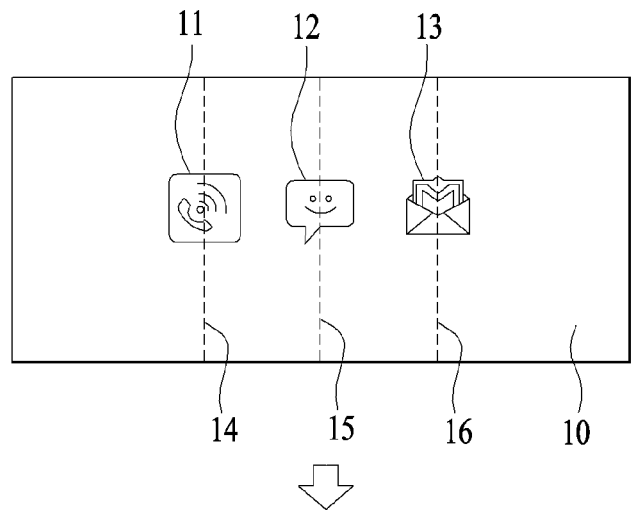
FIG. 1 is a view showing first position correction with respect to a touch point of a flexible display device according to one embodiment of the present specification.
Figure 1:
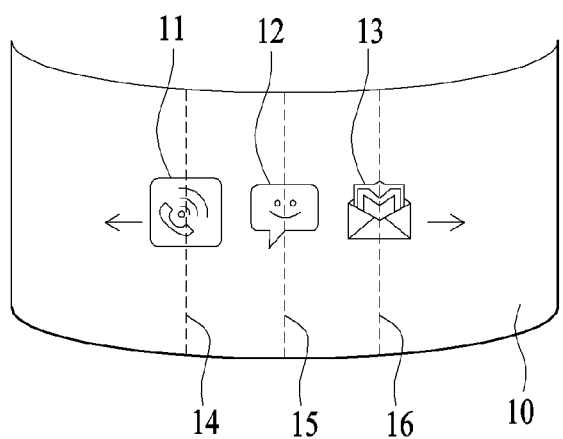
Figure 1:
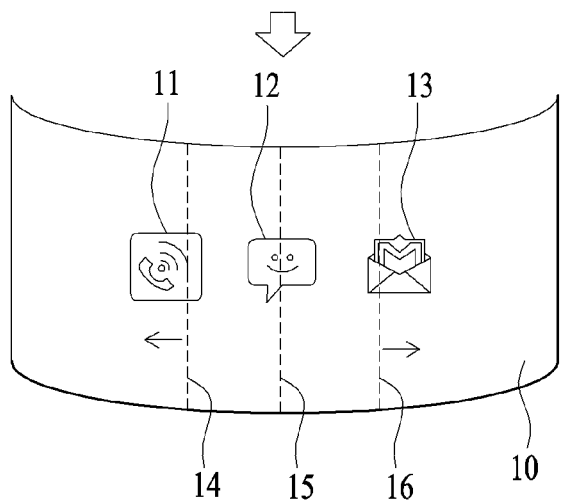

FIG. 1 is a view showing first position correction with respect to a touch point of a flexible display device according to one embodiment of the present specification. The flexible display device may change a position of a displayed object based on bending thereof. In addition, the flexible display device may change, based on the changed position of the object, a position where touch input of selecting the corresponding object is detected.

In the upper of FIG. 1, the flexible display device 10 in a flat state may display an image. The displayed image may include a plurality of graphical objects. The flexible display device 10 may display a first object 11, a second object 12, and a third object 13. When touch input is detected at a position where a first sensing line 14 and the first object 11 cross each other, the flexible display device 10 may detect the corresponding touch input as touch input of selecting the first object 11. Likewise, when touch input is detected at a position where a second sensing line 15 and the second object 12 cross each other, the flexible display device 10 may detect the corresponding touch input as touch input of selecting the second object 12. In addition, when touch input is detected at a position where a third sensing line 16 and the third object 13 cross each other, the flexible display device 10 may detect the corresponding touch input as touch input of selecting the third object 13.

In the middle of FIG. 1, the flexible display device 10 may be bent. The flexible display device 10 in a bent state may display the same image as the image provided by the flexible display device 10 in the flat state. Despite that the flexible display device 10 displays the same image, a user may recognize different images in the flat state and the bent state of the flexible display device 10. This is because the displayed image must be bent by the curvature of the flexible display device 10 upon bending of the flexible display device 10. Accordingly, when the flexible display device 10 is bent such that left and right sides thereof are rolled inward as exemplarily shown in the middle of FIG. 1, a left-and-right length of the displayed image may be changed. That is, as the flexible display device 10 is bent, an angle between the eyes of the user and the flexible display device 10 is changed, which causes the user to recognize an image having a reduced left-and-right length despite that the same image is displayed. For example, in the middle of FIG. 1, a distance between the first object 11 and the second object 12 and a distance between the second object 12 and the third object 13 may be reduced as compared to those in the upper of FIG. 1.

In a case in which distortion of the image occurs due to bending of the flexible display device 10, the flexible display device 10 may compensate for the distortion of the image by changing a position of the displayed object. That is, as exemplarily shown in the lower of FIG. 1, the flexible display device 10 may move a display position of the first object 11 leftward and a display position of the third object 13 rightward, thereby providing an image similar to that provided to the user in the upper of FIG. 1.

As described above, in a case in which the position of the displayed object is changed, the flexible display device 10 needs to simultaneously change a detection position of touch input of selecting the corresponding object. Otherwise the position of the displayed object may differ from the detection position of the touch input when the user visually checks the object whose position is changed and selects the corresponding object using the touch input. Accordingly, as exemplarily shown in the lower of FIG. 1, the flexible display device 10 may detect touch input of selecting the first object 11 by moving a position of the first sensing line 14 leftward or using another sensing line located at the left side of the first sensing line 14. This is because the first object 11 is moved farther leftward than a displayed position thereof in a flat state of the flexible display device 10. In addition, the flexible display device 10 may not change a position of the second sensing line 15 that is used to sense touch input to the second object 12. When the second object 12 is located on a bending axis, a position of the second object 12 recognized by the user is not changed. Accordingly, with regard to an object that is located on a bending axis or that is present within a predetermined distance from the bending axis, the flexible display device 10 may continuously keep a sensing line for the corresponding object at the same position in a flat state and in a bent state thereof. In addition, the flexible display device 10 may detect touch input of selecting the third object 13 by moving a position of the third sensing line 16 rightward or using another sensing line located at the right side of the third sensing line 16. This is because the third object 13 is moved farther rightward than a displayed position thereof in a flat state of the flexible display device 10.

As described above, the flexible display device 10 may change a position of the displayed object based on whether or not the flexible display device 10 is bent, and simultaneously may change a detection position of touch input to the corresponding object. In this way, the touch input of selecting the displayed object may be accurately detected.

Figure 2:
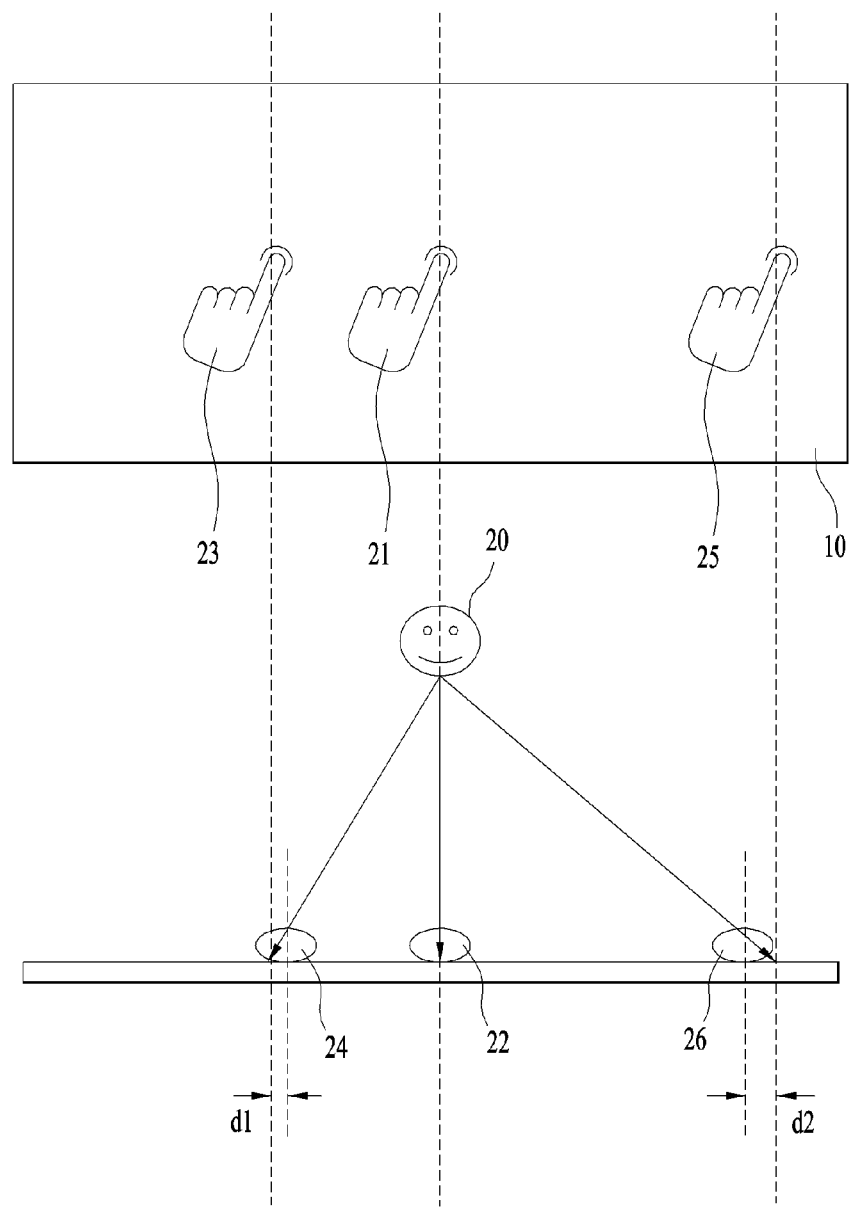
FIG. 2 is a view showing second position correction with respect to a touch point of the flexible display device in a flat state according to one embodiment of the present specification.

FIG. 2 is a view showing second position correction with respect to a touch point of the flexible display device in a flat state according to one embodiment of the present specification. Differently from first position correction with respect to a touch point based on bending of the flexible display device as described above with reference to FIG. 1, second position correction is correction to eliminate an error caused by a difference between a touch point that the eyes of the user recognize and an actual touch point. Accordingly, even when movement of a position of the displayed object as mentioned above with regard to the first position correction does not occur, the flexible display device may implement second position correction.

When the user touches the flexible display device using a finger, a displayed object may be hidden by the user's finger. Although the user may look at the top of the finger that touches the object, the bottom of the finger touches the object displayed on the flexible display device. Thus, a touch position the user recognizes and an actual touch position input to the flexible display device may differ from each other. Therefore, second position correction to correct this difference is necessary. Although FIG. 2 illustrates left-and-right position variation of touch input by way of example, position correction with respect to a touch point according to the present specification may also be applied to up-and-down position variation.

In FIG. 2, a user 20 may touch the flexible display device 10. The upper of FIG. 2 and the lower of FIG. 2 are respectively a plan view and a side sectional view showing the flexible display device 10 in a flat state and user input to the flexible display device 10.

The user 20 may implement first touch input 21 to the flexible display device 10. The first touch input 21 may be input to a first position where the eyes of the user 20 and the flexible display device 10 are substantially perpendicular to each other. According to an embodiment, the first position may be set to a position where an angle between the eyes of the user 20 and the flexible display device 10 falls within a given range on the basis of 90 degrees. The flexible display device 10 may detect a user's finger 22 at the first position. Since the eyes of the user 20 and the flexible display device 10 are substantially perpendicular to each other at the first position, a position the user 20 wishes to touch and an actual contact position between the finger 22 and the flexible display device 10 may be equal to each other. Accordingly, the flexible display device 10 may determine a position where the first touch input 21 is detected as the first position without executing position correction with respect to a touch point.

The user 20 may implement second touch input 23 to the flexible display device 10. The second touch input 23 may be input to a second position where the eyes of the user 20 and the flexible display device 10 have a first angle. The flexible display device 10 may detect a user's finger 24 at the second position. Since the eyes of the user 20 and the flexible display device 10 have the first angle at the second position, a position the user 20 wishes to touch and an actual contact position between the finger 24 and the flexible display device 10 may differ from each other. As exemplarily shown in FIG. 2, the flexible display device 10 may come into contact with the bottom center of the user's finger 24 at the second position. However, the user may recognize as if he/she touches a third position where the eyes of the user 20 who looks at the top center of the finger 24 and the flexible display device 10 cross each other. Here, a distance between the second position and the third position may be defined as d1.

In this case, the flexible display device 10 may execute second position correction with respect to a touch point. The flexible display device 10 may correct position information, regarding the second touch input 23 detected at the second position, from the second position to the third position. In a case in which the second position is in a first direction from the first position, the flexible display device 10 may set the third position to a position moved in the first direction from the second position by the distance d1. The flexible display device 10 may determine the distance d1 based on a distance between the first position and the second position. The flexible display device 10 may determine the distance d1 in proportion to a distance between the first position and the second position.

The user 20 may implement third touch input 25 to the flexible display device 10. The third touch input 25 may be input to a fourth position where the eyes of the user 20 and the flexible display device 10 have a second angle. The flexible display device 10 may detect a user's finger 26 at the fourth position. Since the eyes of the user 20 and the flexible display device 10 have the second angle at the fourth position, a position the user 20 wishes to touch and an actual contact position between the finger 26 and the flexible display device 10 may differ from each other. As exemplarily shown in FIG. 2, the flexible display device 10 may come into contact with the bottom center of the user's finger 26 at the fourth position. However, the user may recognize as if he/she touches a fifth position where the eyes of the user 20 who looks at the top center of the finger 26 and the flexible display device 10 cross each other. Here, a distance between the fourth position and the fifth position may be defined as d2.

In this case, the flexible display device 10 may execute second position correction with respect to a touch point. The flexible display device 10 may correct position information, regarding the third touch input 25 detected at the fourth position, from the fourth position to the fifth position. In a case in which the fourth position is in a second direction from the first position, the flexible display device 10 may set the fifth position to a position moved in the second direction from the fourth position by the distance d2. The flexible display device 10 may determine the distance d2 based on a distance between the first position and the fourth position. The flexible display device 10 may determine the distance d2 in proportion to a distance between the first position and the fourth position. As exemplarily shown, a distance between the first position and the fourth position is greater than a distance between the first position and the second position, and therefore d2 may be set to a greater value than d1. That is, the flexible display device 10 may increase a correction distance based on position information regarding touch input with increasing distance between a touch point and the first position where the eyes of the user 20 and the flexible display device 10 are substantially perpendicular to each other.

Figure 3:
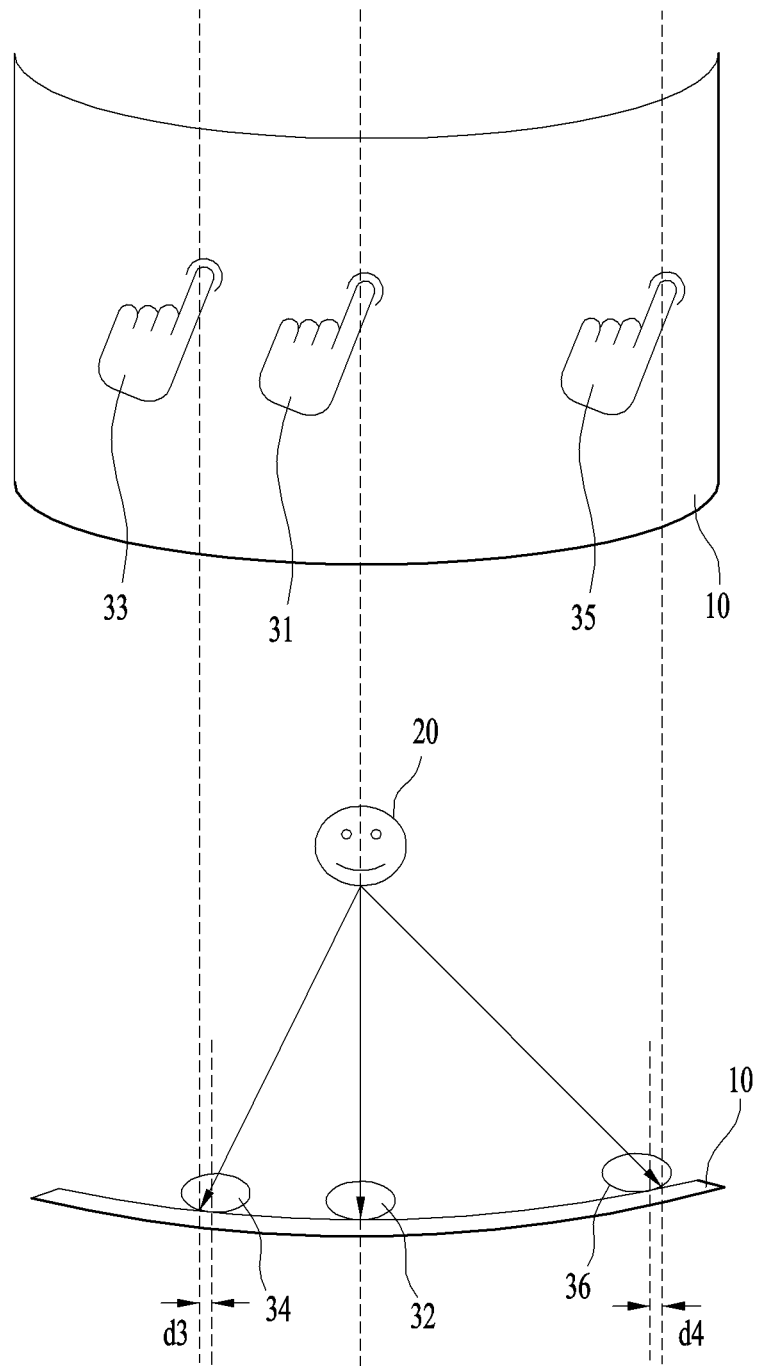
FIG. 3 is a view showing second position correction with respect to a touch point of the flexible display device in a first bent state according to one embodiment of the present specification.

FIG. 3 is a view showing second position correction with respect to a touch point of the flexible display device in a first bent state according to one embodiment of the present specification. Second position correction is correction to eliminate an error caused by a difference between a touch point that the user's eyes recognize and an actual touch point. When the user touches the flexible display device using a finger, a displayed object may be hidden by the user's finger. Although the user may look at the top of the finger that touches the object, the bottom of the finger touches the object displayed on the flexible display device. Thus, a touch position the user recognizes and an actual touch position input to the flexible display device may differ from each other. Therefore, second position correction to correct this difference is necessary. Although FIG. 3 illustrates left-and-right position variation of touch input by way of example, position correction with respect to a touch point according to the present specification may also be applied to up-and-down position variation.

In FIG. 3, the user 20 may touch the flexible display device 10. The upper of FIG. 3 and the lower of FIG. 3 are respectively a plan view and a side sectional view, showing the flexible display device 10 in a first bent state and user input to the flexible display device 10.

The user 20 may implement first touch input 31 to the flexible display device 10. The first touch input 31 may be input to a first position where the eyes of the user 20 and the flexible display device 10 are substantially perpendicular to each other. According to an embodiment, the first position may be set to a position where an angle between the eyes of the user 20 and the flexible display device 10 falls within a given range on the basis of 90 degrees. In addition, the first position may be present on a bending axis or within a given distance from the bending axis upon bending of the flexible display device 10.

The flexible display device 10 may detect a user's finger 32 at the first position. Since the eyes of the user 20 and the flexible display device 10 are substantially perpendicular to each other at the first position, a position the user 20 wishes to touch and an actual contact position between the finger 32 and the flexible display device 10 may be equal to each other. Accordingly, the flexible display device 10 may determine a position where the first touch input 31 is detected as the first position without executing position correction with respect to a touch point.

The user 20 may implement second touch input 33 to the flexible display device 10. The second touch input 33 may be input to a second position where the eyes of the user 20 and the flexible display device 10 have a first angle. The flexible display device 10 may detect a user's finger 34 at the second position. Since the eyes of the user 20 and the flexible display device 10 have the first angle at the second position and the flexible display device 10 is bent, a position the user 20 wishes to touch and an actual contact position between the finger 34 and the flexible display device 10 may differ from each other. As exemplarily shown in FIG. 3, the flexible display device 10 may come into contact with the bottom center of the user's finger 34 at the second position. However, the user may recognize as if he/she touches a third position where the eyes of the user 20 who looks at the top center of the finger 34 and the flexible display device 10 cross each other. Here, a distance between the second position and the third position may be defined as d3.

Although FIG. 2 shows that the bottom center of the finger comes into contact with the flexible display device 10, in the case of FIG. 3, the flexible display device 10 is in a bent state and, therefore, a contact position may not be the bottom center of the finger. That is, in a case in which the second position is in a first direction from a bending axis of the flexible display device 10, a portion of the finger biased in the first direction from the bottom center of the finger may come into contact with the flexible display device 10. Accordingly, d3 in the bent state may be defined as a less value than d1 in the flat state. That is, the flexible display device 10 may set a correction distance in the first bent state to be less than a correction distance in the flat state upon implementing correction with respect to touch input of touching the same position on a flexible display unit.

In this case, the flexible display device 10 may execute second position correction with respect to a touch point. The flexible display device 10 may correct position information, regarding the second touch input 33 detected at the second position, from the second position to the third position. In a case in which the second position is in a first direction from the first position, the flexible display device 10 may set the third position to a position moved in the first direction from the second position by the distance d3. The flexible display device 10 may determine the distance d3 based on a distance between the first position and the second position. The flexible display device 10 may determine the distance d3 in proportion to a distance between the first position and the second position.

The user 20 may implement third touch input 35 to the flexible display device 10. The third touch input 35 may be input to a fourth position where the eyes of the user 20 and the flexible display device 10 have a second angle. The flexible display device 10 may detect a user's finger 36 at the fourth position. Since the eyes of the user 20 and the flexible display device 10 have the second angle at the fourth position and the flexible display device 10 is bent, a position the user 20 wishes to touch and an actual contact position between the finger 36 and the flexible display device 10 may differ from each other. As exemplarily shown in FIG. 3, the flexible display device 10 may come into contact with the bottom center of the user's finger 36 at the fourth position. However, the user may recognize as if he/she touches a fifth position where the eyes of the user 20 who looks at the top center of the finger 36 and the flexible display device 10 cross each other. Here, a distance between the fourth position and the fifth position may be defined as d4.

Although FIG. 2 shows that the bottom center of the finger comes into contact with the flexible display device 10, in the case of FIG. 3, the flexible display device 10 is in a bent state and, therefore, a contact position may not be the bottom center of the finger. That is, in a case in which the fourth position is in a second direction from a bending axis of the flexible display device 10, a portion of the finger biased in the second direction from the bottom center of the finger may come into contact with the flexible display device 10. Accordingly, d4 in the bent state may be defined as a less value than d2 in the flat state.

In this case, the flexible display device 10 may execute second position correction with respect to a touch point. The flexible display device 10 may correct position information, regarding the third touch input 35 detected at the fourth position, from the fourth position to the fifth position. In a case in which the fourth position is in a second direction from the first position, the flexible display device 10 may set the fifth position to a position moved in the second direction from the fourth position by the distance d4. The flexible display device 10 may determine the distance d4 based on a distance between the first position and the fourth position. The flexible display device 10 may determine the distance d4 in proportion to a distance between the first position and the fourth position. As exemplarily shown, a distance between the first position and the fourth position is greater than a distance between the first position and the second position, and therefore d4 may be set to a greater value than d3. That is, the flexible display device 10 may increase a correction distance based on position information regarding touch input with increasing distance between a touch point and the first position where the eyes of the user 20 and the flexible display device 10 are substantially perpendicular to each other.

Figure 4:
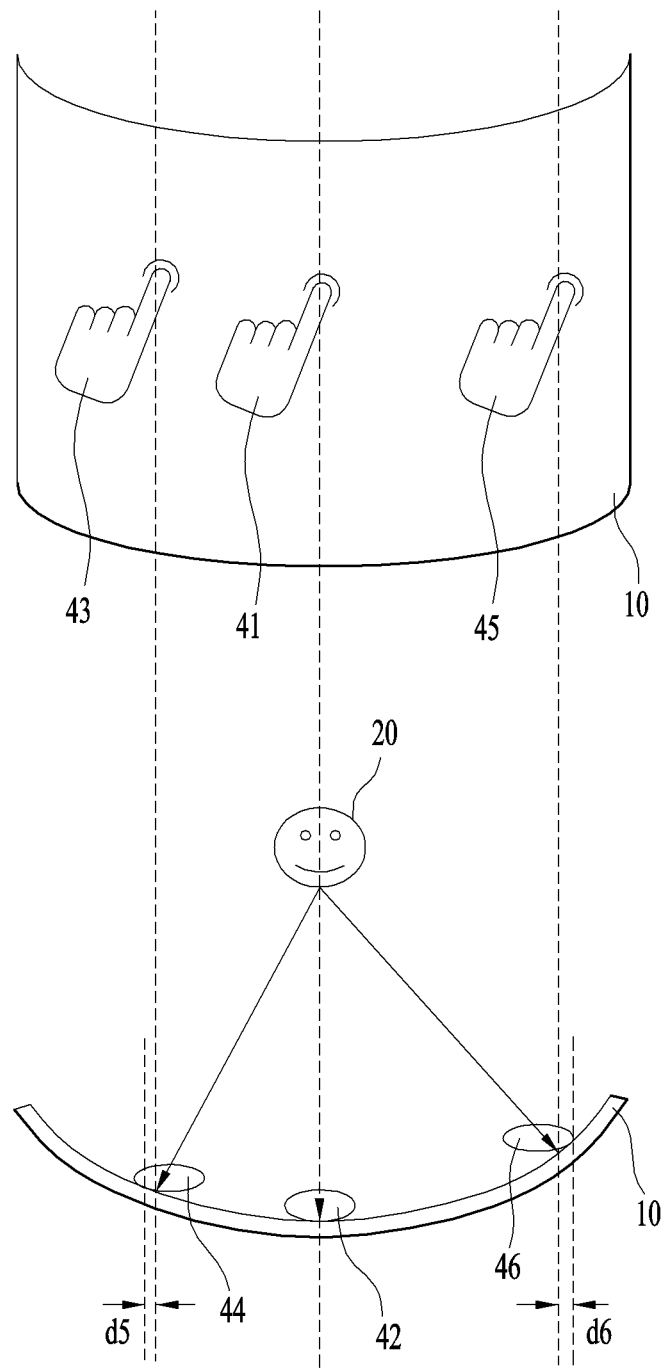
FIG. 4 is a view showing second position correction with respect to a touch point of the flexible display device in a second bent state according to one embodiment of the present specification.

FIG. 4 is a view showing second position correction with respect to a touch point of the flexible display device in a second bent state according to one embodiment of the present specification. The second bent state of the flexible display device may be defined as a state in which a bending angle of the flexible display device is greater than that in the first bent state. Second position correction is correction to eliminate an error caused by a difference between a touch point that the user's eyes recognize and an actual touch point. When the user touches the flexible display device using a finger, a displayed object may be hidden by the user's finger. Although the user may look at the top of the finger that touches the object, the bottom of the finger touches the object displayed on the flexible display device. Thus, a touch position where the user recognizes and an actual touch position input to the flexible display device may differ from each other. Therefore, second position correction to correct this difference is necessary. Although FIG. 4 illustrates left-and-right position variation of touch input by way of example, position correction with respect to a touch point according to the present specification may also be applied to up-and-down position variation.

In FIG. 4, the user 20 may touch the flexible display device 10. The upper of FIG. 4 and the lower of FIG. 4 are respectively a plan view and a side sectional view, showing the flexible display device 10 in a second bent state and user input to the flexible display device 10.

The user 20 may implement first touch input 41 to the flexible display device 10. The first touch input 41 may be input to a first position where the eyes of the user 20 and the flexible display device 10 are substantially perpendicular to each other. According to an embodiment, the first position may be set to a position where an angle between the eyes of the user 20 and the flexible display device 10 falls within a given range on the basis of 90 degrees. In addition, the first position may be present on a bending axis or within a given distance from the bending axis upon bending of the flexible display device 10.

The flexible display device 10 may detect a user's finger 42 at the first position. Since the eyes of the user 20 and the flexible display device 10 are substantially perpendicular to each other at the first position, a position the user 20 wishes to touch and an actual contact position between the finger 42 and the flexible display device 10 may be equal to each other. Accordingly, the flexible display device 10 may determine a position where the first touch input 41 is detected as the first position without executing position correction with respect to a touch point.

The user 20 may implement second touch input 43 to the flexible display device 10. The second touch input 43 may be input to a second position where the eyes of the user 20 and the flexible display device 10 have a first angle. The flexible display device 10 may detect a user's finger 44 at the second position. Since the eyes of the user 20 and the flexible display device 10 have the first angle at the second position and the flexible display device 10 is bent, a position the user 20 wishes to touch and an actual contact position between the finger 44 and the flexible display device 10 may differ from each other. As exemplarily shown in FIG. 4, the flexible display device 10 may come into contact with the bottom center of the user's finger 44 at the second position. However, the user may recognize as if he/she touches a third position where the eyes of the user 20 who looks at the top center of the finger 44 and the flexible display device 10 cross each other. Here, a distance between the second position and the third position may be defined as d5.

Although FIG. 2 shows that the bottom center of the finger comes into contact with the flexible display device 10, in the case of FIG. 4, the flexible display device 10 is in a bent state and, therefore, a contact position may not be the bottom center of the finger. That is, in a case in which the second position is in a first direction from a bending axis of the flexible display device 10, a portion of the finger biased in the first direction from the bottom center of the finger may come into contact with the flexible display device 10. A bending angle of the flexible display device 10 in the second bent state may be greater than that in the first bent state. Accordingly, in a case in which the second position is in the first direction from a bending axis, the second position may be located farther from a position the user 20 wishes to touch in the first direction by a distance d5. Thus, a correction direction in the second bent state may be defined as a direction opposite to a correction direction in the flat state and in the first bent state. That is, assuming that a correction direction in the flat state and in the first bent state is a first direction, the flexible display device 10 may set a correction direction in the second bent state to a second direction opposite to the first direction upon implementing correction with respect to a touch input of touching the same position on a flexible display unit.

In this case, the flexible display device 10 may execute second position correction with respect to a touch point. The flexible display device 10 may correct position information, regarding the second touch input 43 detected at the second position, from the second position to the third position. In a case in which the second position is in a first direction from the first position, the flexible display device 10 may set the third position to a position moved in the second direction opposite to the first direction from the second position by the distance d5. The flexible display device 10 may determine the distance d5 based on a distance between the first position and the second position. The flexible display device 10 may determine the distance d5 in proportion to a distance between the first position and the second position.

The user 20 may implement third touch input 45 to the flexible display device 10. The third touch input 45 may be input to a fourth position where the eyes of the user 20 and the flexible display device 10 have a second angle. The flexible display device 10 may detect a user's finger 46 at the fourth position. Since the eyes of the user 20 and the flexible display device 10 have the second angle at the fourth position and the flexible display device 10 is bent, a position the user 20 wishes to touch and an actual contact position between the finger 46 and the flexible display device 10 may differ from each other. As exemplarily shown in FIG. 4, the flexible display device 10 may come into contact with the bottom center of the user's finger 46 at the fourth position. However, the user may recognize as if he/she touches a fifth position where the eyes of the user 20 who looks at the top center of the finger 46 and the flexible display device 10 cross each other. Here, a distance between the fourth position and the fifth position may be defined as d6.

Although FIG. 2 shows that the bottom center of the finger comes into contact with the flexible display device 10, in the case of FIG. 3, the flexible display device 10 is in a bent state and, therefore, a contact position may not be the bottom center of the finger. That is, in a case in which the fourth position is in a second direction from a bending axis of the flexible display device 10, a portion of the finger biased in the second direction from the bottom center of the finger may come into contact with the flexible display device 10. A bending angle of the flexible display device 10 in the second bent state may be greater than that in the first bent state. Accordingly, in a case in which the second position is in the second direction from a bending axis, the fourth position may be located farther from a position the user 20 wishes to touch in the second direction by a distance d6. Thus, a correction direction in the second bent state may be defined as a direction opposite to a correction direction in the flat state and in the first bent state. That is, assuming that a correction direction in the flat state and in the first bent state is a second direction, the flexible display device 10 may set a correction direction in the second bent state to a first direction opposite to the second direction upon implementing correction with respect to touch input of touching the same position on the flexible display unit.

In this case, the flexible display device 10 may execute second position correction with respect to a touch point. The flexible display device 10 may correct position information, regarding the third touch input 45 detected at the fourth position, from the fourth position to the fifth position. In a case in which the fourth position is in a second direction from the first position, the flexible display device 10 may set the fifth position to a position moved in the first direction from the fourth position by the distance d6. The flexible display device 10 may determine the distance d6 based on a distance between the first position and the fourth position. The flexible display device 10 may determine the distance d4 in proportion to a distance between the first position and the fourth position. As exemplarily shown, a distance between the first position and the fourth position is greater than a distance between the first position and the second position, and therefore d6 may be set to a greater value than d5. That is, the flexible display device 10 may increase a correction distance based on position information regarding touch input with increasing distance between a touch point and the first position where the eyes of the user 20 and the flexible display device 10 are substantially perpendicular to each other.

Figure 5:
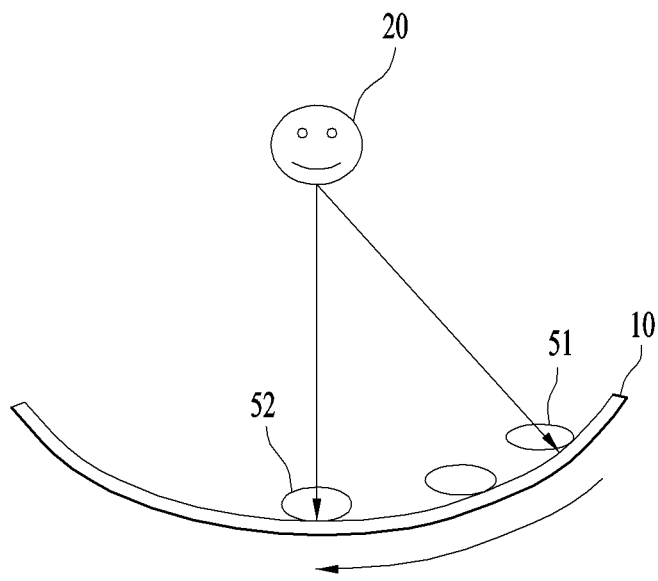
FIG. 5 is a view showing a method for correcting drag input to the flexible display device according to one embodiment of the present specification.
Figure 5:
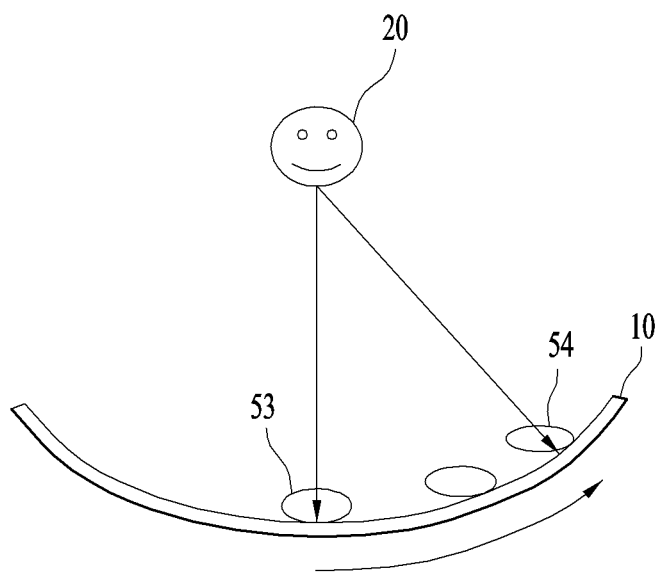

FIG. 5 is a view showing a method for correcting drag input with respect to the flexible display device according to one embodiment of the present specification. The flexible display device 10 may correct position information regarding drag input. The flexible display device 10 may change a correction distance of position information as the position information regarding drag input is changed by a user drag motion.

In the upper of FIG. 5, the user 20 may touch a first position of the flexible display device 10 in a bent state using a finger 51. The first position may be located in a first direction from a bending axis of the flexible display device 10. The flexible display device 10, as described above with reference to FIGS. 3 and 4, may correct position information regarding the touch input detected at the first position from the first position to a second position. Here, a distance between the first position and the second position may be defined as d7. A correction direction may be changed based on a bent state of the flexible display device 10. In a case in which the flexible display device 10 is in a first bent state, a correction direction may be the first direction from the bending axis toward the first position. In a state in which the flexible display device 10 is in a second bent state, a correction direction may be a second direction opposite to the first direction.

The flexible display device 10 may detect drag input by the finger 51 detected at the first position. The finger 51 detected at the first position may be continuously dragged to a position on the bending axis of the flexible display device 10. The flexible display device 10 may not implement position correction, as described above with reference to FIGS. 3 and 4, with respect to the position on the bending axis where a user's finger 52 touches. That is, assuming that the position on the bending axis is a third position, the flexible display device 10 may set position information regarding drag input to the third position without correction of a touch position with respect to the drag input detected at the third position. Accordingly, a position correction distance on the basis of the bending axis may be zero. The flexible display device 10 may stepwise or continuously reduce the correction distance with respect to the touch position from d7 to zero while the touch input detected at the first position is dragged to the third position. Thereby, the flexible display device 10 may implement accurate touch position correction with respect to the continuously moving drag input.

In the lower of FIG. 5, the user 20 may touch a fourth position of the flexible display device 10 in a bent state using a finger 53. The fourth position may be located on the bending axis of the flexible display device 10. The flexible display device 10, as described above with reference to FIGS. 3 and 4, may directly determine and use position information regarding the touch input detected at the fourth position without correction. Accordingly, a position correction distance on the basis of the bending axis may be zero.

The flexible display device 10 may detect drag input by the finger 53 detected at the fourth position. The finger 53 detected at the fourth position may be continuously dragged to a fifth position of the flexible display device 10. The flexible display device 10 may implement position correction, as described above with reference to FIGS. 3 and 4, with respect to a user's finger 54 on the fifth position. The flexible display device 10 may correct position information regarding the drag input detected at the fifth position from the fifth position to a sixth position. Here, a distance between the fifth position and the sixth position may be defined as d8. A correction direction may be changed based on a bent state of the flexible display device 10. In a case in which the flexible display device 10 is in a first bent state, a correction direction may be a first direction from the bending axis to the fifth position. In a case in which the flexible display device 10 is in a second bent state, a correction direction may be a second direction opposite to the first direction.

The flexible display device 10 may stepwise or continuously increase the correction distance with respect to the touch position from zero to d8 while the touch input detected at the fourth position is dragged to the fifth position. Thereby, the flexible display device 10 may implement accurate touch position correction with respect to the continuously moving drag input.

Figure 6:
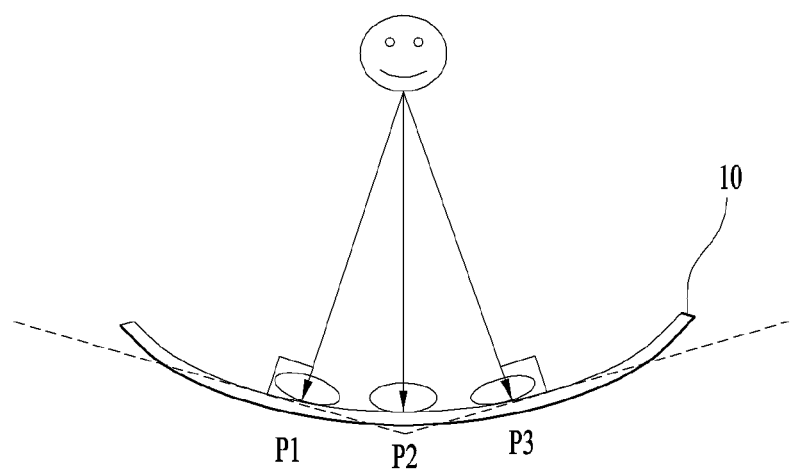
FIG. 6 is a view showing a method for determining a bent state of a flexible display device according to one embodiment of the present specification.

FIG. 6 is a view showing a method for determining a bent state of the flexible display device according to one embodiment of the present specification. The flexible display device 10 may determine a first bent state or a second bent state based on an angle between the eyes of the user and the flexible display device 10.

The flexible display device 10 may be set to a first bent state when a bending angle is below a threshold angle, and may be set to a second bent state when a bending angle exceeds the threshold angle. Here, the threshold angle may be a bending angle of the flexible display device 10 in a case in which an angle between the eyes of the user who looks at a position where touch input occurs and the flexible display device 10 is within a first angle range including a right angle. In FIG. 6, when the flexible display device 10 detects touch input at a first position P1, an angle between the eyes of the user and the flexible display device 10 may be a right angle at the first position P1. In addition, since the flexible display device 10 is bendable, an angle between the eyes of the user and the flexible display device 10 at a second position P2 may be a right angle when touch input occurs at the second position P2 in a bent state of the flexible display device 10. Likewise, when touch input occurs at a third position P3 in a bent state of the flexible display device 10, an angle between the eyes of the user and the flexible display device 10 at the third position P3 may be a right angle. Accordingly, when the user's touch input occurs at the second position P2 or the third position P3, a bending angle of the flexible display device 10 in FIG. 6 may be the threshold angle. As described above, in a case in which the bending angle is equal to the threshold angle, the flexible display device 10 may not implement correction of position information regarding the touch input detected at the second position P2 or the third position P3.

The flexible display device 10 may be set to a first bent state when a bending angle thereof is below the threshold angle. When the flexible display device 10 is set to the first bent state, the flexible display device 10 may reduce a correction distance of the position information regarding the touch input as the bending angle is increased.

In a case in which the bending angle exceeds the threshold angle, the flexible display device 10 may be set to a second bent state. When the flexible display device 10 is set to the second bent state, the flexible display device 10 may increase a correction distance of the position information regarding the touch input as the bending angle is increased.

That is, the flexible display device 10 may be set to the first bent state when undergoing bending in a flat state thereof, and may be set to the second bent state when the bending angle thereof in the first bent state exceeds the threshold angle. Likewise, the flexible display device 10 may be set to the first bent state when the bending angle thereof in the second bent state is reduced below the threshold angle, and may be set to a flat state when the bending angle thereof in the first bent state is close to zero.

Figure 7:
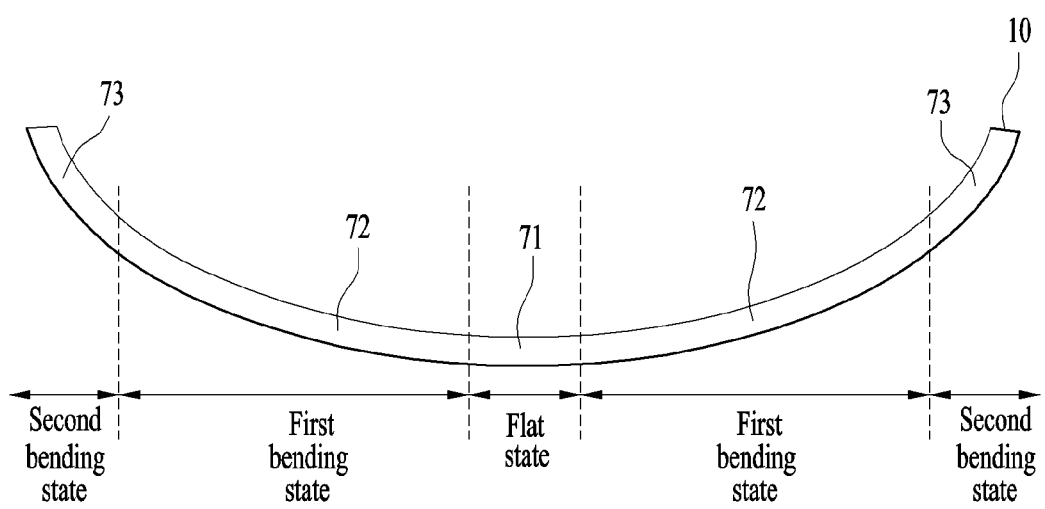
FIG. 7 is a view showing state setting on a per region basis of the flexible display device according to one embodiment of the present specification.

FIG. 7 is a view showing state setting on a per region basis of the flexible display device according to one embodiment of the present specification. In a case in which bending of the flexible display device 10 occurs, a state of the flexible display device 10 may be set on a per region basis. For example, as exemplarily shown in FIG. 7, the flexible display device 10 may classify touch sensitive regions into three kinds of regions.

The bent flexible display device 10 may set a first region 71 including a bending axis to a flat state. Thus, the flexible display device 10 may implement touch position correction in the first region 71 that is in a flat state as described above with reference to FIG. 2. The bent flexible display device 10 may set second regions 72 proximate to both sides of the first region 71 to a first bent state. Thus, the flexible display device 10 may implement touch position correction in the second regions 72 that are in the first bent state as described above with reference to FIG. 3. The bent flexible display device 10 may set third regions 73 located at edges thereof to a second bent state. Thus, the flexible display device 10 may implement touch position correction in the third regions 73 that are in the second bent state as described above with reference to FIG. 4.

A boundary between the first and second regions 71 and 72 and a boundary between the second and third regions 72 and 73 may be changed based on the bending angle of the flexible display device 10 or the bending angle of each region.

In addition, according to an embodiment, the flexible display device 10 may set touch sensitive regions to two kinds of regions. Although not shown, the flexible display device 10 may set a first region including a bending axis thereof to a flat state, and the other regions proximate to the first region to a first bent state or a second bent state. In addition, the flexible display device 10 may set the first region including the bending axis to the first bent state and the other regions proximate to the first region to the second bent state.

The flexible display device 10 may implement accurate position correction with respect to touch input on a per region basis by applying different correction distances and different correction directions of position information regarding the touch input on a per region basis.

Figure 8:
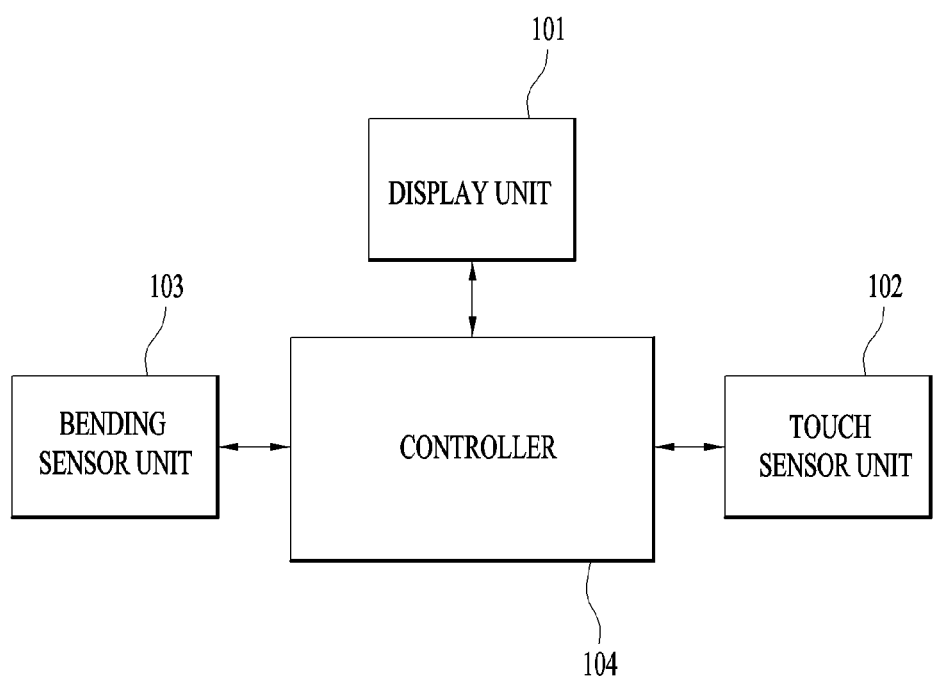
FIG. 8 is a block diagram of the flexible display device according to one embodiment of the present specification.

FIG. 8 is a block diagram of the flexible display device according to one embodiment of the present specification. The flexible display device may include a display unit 101, a touch sensor unit 102, a bending sensor unit 103, and a controller 104. In addition, according to an embodiment, as an optional component, the flexible display device may further include a gaze detecting unit configured to detect the eyes of the user.

The display unit 101 may display a virtual reality image. A Head Mounted Display (HMD) may track movement of the user's head, and the display unit 101 may change a region of the virtual reality image to be displayed based on movement of the user's head. In this way, the user may view a virtual reality image allotted in each direction even if the user views a front direction, a lateral direction, or a rear direction. As a result, the user may feel as if the user is in a virtual space created by the virtual reality image.

The display unit 101 may display an image including visual information. The display unit 101 may include a flexible display unit, a foldable display unit, a rollable display unit, or a bendable display unit. The display unit 101, as described above with reference to FIG. 1, may correct a displayed image based on bending of the flexible display device, and display the corrected image. In addition, the display unit 101 may display an image or object corresponding to touch input whose position information is corrected.

The touch sensor unit 102 may sense touch input to the flexible display device. As described above, the touch sensor unit 102 may sense touch input, and transmit position information regarding the touch input to the controller 104. As described above with reference to FIGS. 2 to 4, position information regarding the sensed touch input may differ from a position the user wishes to touch, and the controller 104 may change position information regarding the sensed touch input to a position the user wishes to touch via correction of the position information. The touch sensor unit 102 may include a pressure sensitive or capacitive touch sensor.

The bending sensor unit 103 may sense a bending angle of the flexible display device, and transmit the sensed bending angle to the controller 104. The bending sensor unit 103 may sense the bending angle of the flexible display device when the flexible display device is bent about a single bending axis. In addition, the bending sensor unit 103 may sense a bending angle per each region included in the flexible display device when the flexible display device is bent about a plurality of bending axes. The bending sensor unit 103 may transmit the sensed bending angle to the controller 104. The bending angle sensed by the bending sensor unit 103 may be a factor in determining the state of the flexible display device. The flexible display device may be set to at least one state among the flat state, the first bent state, and the second bent state based on the bending angle thereof. As described above with reference to FIG. 7, the state of a single flexible display device may be differently set on a per region basis.

The controller 104 may correct position information regarding touch input based on the sensed results transmitted from the touch sensor unit 102 and the bending sensor unit 103. As described above with reference to FIGS. 2 to 4, the controller 104 may implement different touch position corrections with respect to touch input detected at the same first position based on the bending angle. In a case in which the flexible display unit is in a flat state, the controller 104 may correct position information regarding the touch input detected at the first position of the flexible display unit from the first position to a second position. In addition, in a case in which the flexible display unit is in a first bent state, the controller 104 may correct position information regarding the touch input detected at the first position of the flexible display unit from the first position to a third position. Here, a distance between the first position and the third position may be less than a distance between the first position and the second position. In addition, in a case in which the flexible display unit is in a second bent state, the controller 104 may correct position information regarding the touch input detected at the first position of the flexible display unit from the first position to a fourth position. Here, the second bent state may be defined as a state in which a bending angle of the flexible display unit is greater than that in the first bent state on the basis of the same bending axis. In addition, with regard to correction of position information regarding touch input, the second position and the third position may be located in a first direction from the first position, and the fourth position may be located in a second direction from the first position. Here, the first direction is a given direction from the bending axis of the flexible display unit to the first position, and the second direction is a direction opposite to the first direction from the first position to the bending axis. That is, the controller 104 may set the first and second directions to opposite directions.

FIG. 8 is a block diagram in accordance with one embodiment. In FIG. 8, separately shown blocks represent logically separated elements of the flexible display device. Thus, the elements of the flexible display device as described above may be mounted as one chip or a plurality of chips according to design of the flexible display device.

Figure 9:
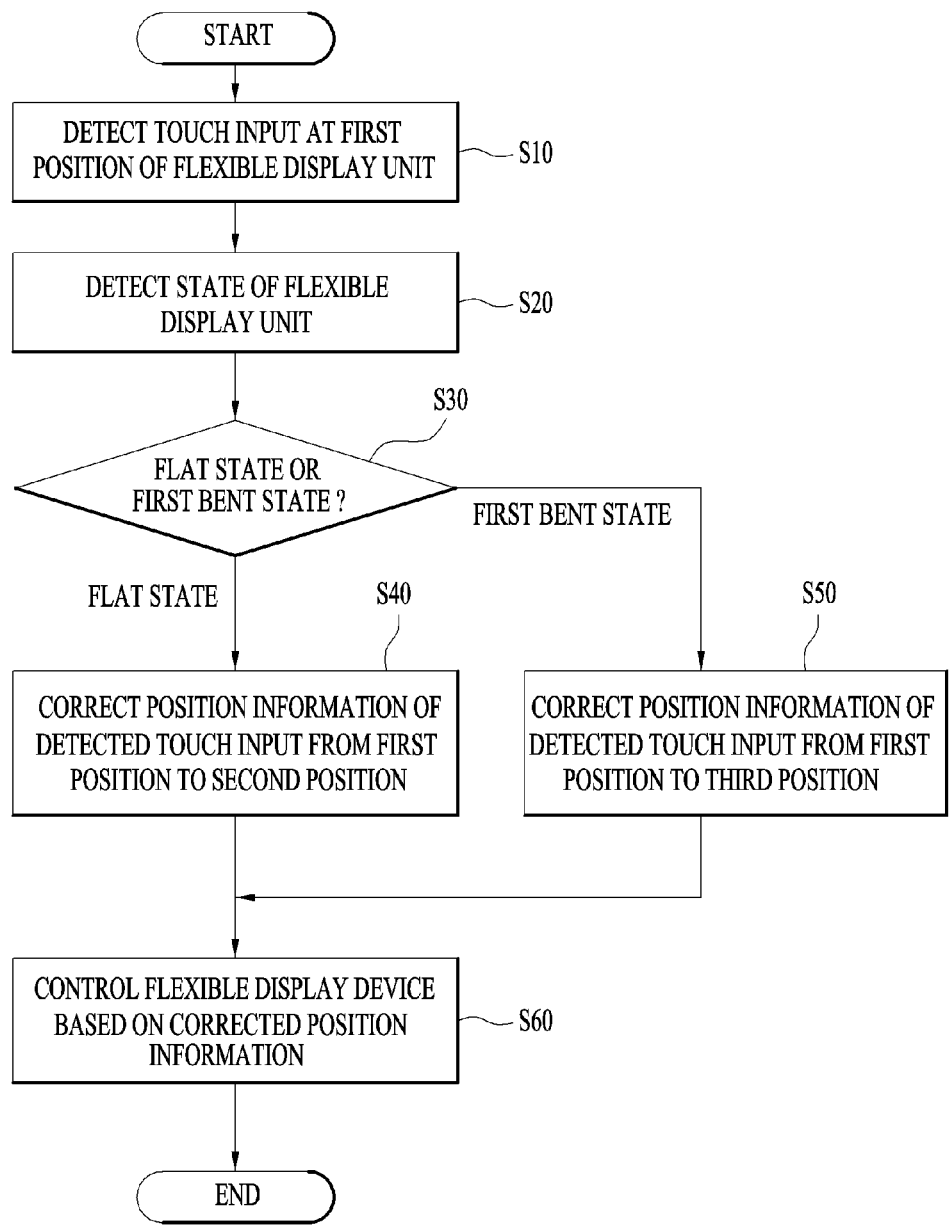
FIG. 9 is a flowchart showing operation of the flexible display device according to one embodiment of the present specification.

FIG. 9 is a flowchart showing operation of the flexible display device according to one embodiment of the present specification. The flexible display device may detect touch input at a first position of the flexible display unit (S10). The flexible display device may detect the touch input at the first position using the touch sensor unit. The first position may be defined as a position the user actually touches. The flexible display device may judge whether or not the first position where touch input is detected coincides with an accurate position the user wishes to touch based on a state of the flexible display unit as described below.

The flexible display device may detect a state of the flexible display unit (S20). The flexible display device may detect the state of the flexible display unit using the bending sensor unit. The state of the flexible display unit may include a flat state and a bent state. In addition, the bent state may include a first bent state and a second bent state. The flexible display unit may include one or more bending axes. Under the presence of the plurality of bending axes, as described above with reference to FIG. 7, the state of the flexible display unit may be set on a per region basis.

The flexible display device may determine whether the flexible display unit is in the flat state or in the first bent state (S30). The controller of the flexible display device may determine whether the flexible display unit is in the flat state or in the first bent state based on the sensed results transmitted from the bending sensor unit. Although not shown, the flexible display device may additionally determine whether the flexible display unit is in the second bent state. The flexible display device may determine a correction direction based on the state of the flexible display unit, and determine a correction distance based on a distance between the first position and the bending axis.

In a case in which the flexible display unit is in the flat state, the flexible display device may correct position information regarding the detected touch input from the first position to a second position (S40). As described above with reference to FIG. 2, the flexible display device may correct position information regarding the touch input from the first position to the second position located in a first direction. The first direction may be defined as a direction toward the first position from the bending axis of the flexible display unit. In addition, the flexible display device may correct position information regarding touch input from the first position to the second position, the second position being spaced apart from the first position by a first distance in the first direction. The flexible display device may set the first distance in proportion to a distance from the bending axis to the first position.

In a case in which the flexible display unit is in the first bent state, the flexible display device may correct position information regarding the detected touch input from the first position to a third position (S50). As described above with reference to FIG. 3, the flexible display device may correct position information regarding the touch input from the first position to the third position located in the first direction. The first direction may be defined as a direction toward the first position from the bending axis of the flexible display unit. In addition, the flexible display device may correct position information regarding the touch input from the first position to the third position, the third position being spaced apart from the first position by a second distance in the first direction. The flexible display device may set the second distance in proportion to a distance from the bending axis to the first position. In addition, the flexible display device may set the second distance to a less value than the first distance. The flexible display device may increase a difference between the first distance and the second distance as the bending angle in the first bent state is increased. That is, the flexible display device may reduce the second distance as the bending angle in the first bent state is increased.

Although not shown, in a case in which the flexible display unit is in the second bent state, the flexible display device may correct position information regarding the touch input from the first position to a fourth position. The flexible display device may set a position located in a second direction from the first position to the fourth position. Here, the second direction may be set to a direction opposite to the first direction that is a correction direction of the second position and the third position.

As described above with reference to FIG. 4, the flexible display device may correct position information regarding touch input from the first position to a fourth position located in the second direction. The second direction may be defined as a direction from the first position toward the bending axis of the flexible display unit. In addition, the flexible display device may correct position information regarding touch input from the first position to a fourth position that is spaced apart from the first position in the second direction by a third distance. The flexible display device may set the third distance in proportion to a distance from the bending axis to the first position. The flexible display device may increase the third distance as the bending angle in the second bent state is increased.

The flexible display device may control the flexible display unit based on the corrected position information (S60). The flexible display device may implement a control instruction based on the position information regarding touch input corrected based on each state of the flexible display unit. For example, the flexible display device may control an image or object displayed at a position corresponding to the corrected position information. In addition, the flexible display device may execute an application displayed at a position corresponding to the corrected position information. The flexible display device is not controlled based on a position where touch input is actually detected, but based on a position corresponding to the corrected position information regarding touch input.

As described above, the flexible display device may implement touch sensing that accurately reflects the will of the user by correcting position information regarding touch input using different correction directions and correction distances based on a state of the flexible display unit. In this way, the flexible display device may reduce touch sensing errors.

As is apparent from the above description, according to the present specification, a flexible display device may differently correct a position where touch input is detected based on whether the flexible display device is in a flat state or in a bent state.

In addition, according to the present specification, the flexible display device may divide a bent state thereof into a first bent state and a second bent state, such that the position where touch input is detected is differently corrected based on whether the flexible display device is in the first bent state or in the second bent state.

In addition, according to the present specification, the flexible display device may differently set a correction direction of the position where touch input is detected based on a bending angle thereof.

In addition, according to the present specification, the flexible display device may accurately detect a position a user wishes to touch via position correction regarding touch input.

In addition, according to the present specification, the flexible display device may set a state thereof on a per touch region basis, and correct position information regarding touch input on a per touch region basis.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

What is claimed is:

1. A flexible display device comprising:
    a flexible display unit having a flat state and a bent state;
    a touch sensor unit configured to sense touch input;
    a bending sensor unit configured to sense a bending angle of the flexible display unit; and
    a controller configured to control the flexible display unit, the touch sensor unit, and the bending sensor unit,
    wherein the controller is further configured to:
    correct position information of the touch input detected at a first position of the flexible display unit to a second position when the flexible display unit is in the flat state, and
    correct the position information of the touch input detected at the first position to a third position when the flexible display unit is in a first bent state,
    wherein a first distance between the first position and the second position exceeds a second distance between the first position and the third position.

2. The device according to claim 1, wherein the controller is further configured to correct the position information of the touch input detected at the first position to a fourth position when the flexible display unit is in a second bent state.

3. The device according to claim 2, wherein the second bent state is a state in which the bending angle of the flexible display unit is greater than that in the first bent state based on an identical bending axis.

4. The device according to claim 2, wherein the second position and the third position are located in a first direction from the first position.

5. The device according to claim 4, wherein the fourth position is located in a second direction from the first position.

6. The device according to claim 5, wherein the second direction is a direction toward a bending axis of the flexible display unit from the first position.

7. The device according to claim 5, wherein the first direction and the second direction are opposite to each other.

8. The device according to claim 2, wherein the flexible display unit is set to the first bent state when the bending angle is below a threshold angle, and
    wherein the flexible display unit is set to the second bent state when the bending angle exceeds the threshold angle.

9. The device according to claim 8, wherein the second distance is reduced as the bending angle is increased when the flexible display unit is set to the first bent state.

10. The device according to claim 8, wherein a third distance between the first position and the fourth position is increased as the bending angle is increased when the flexible display unit is set to the second bent state.

11. The device according to claim 8, wherein the controller does not implement correction of the position information of the touch input detected at the first position when the bending angle is equal to the threshold angle.

12. The device according to claim 11, further comprising a gaze detecting unit configured to detect eyes of a user.

13. The device according to claim 12, wherein the threshold angle is the bending angle of the flexible display unit when an angle between the eyes of the user who looks at the first position and the flexible display unit included a first angle range including a right angle.

14. The device according to claim 2, wherein the second distance or a third distance between the first position and the fourth position is increased when a distance between a bending axis of the flexible display unit and the first position is increased.

15. The device according to claim 2, wherein the flexible display unit is divided into a first region and a second region.

16. The device according to claim 15, wherein the controller sets the first region and the second region to a first region state and a second region state respectively, the first region state and the second region state respectively being the flat state, the first bent state, or the second bent state, and
    wherein the controller corrects the position information of the touch input in the first region and the second region based on the first region state and the second region state respectively.

17. The device according to claim 1, wherein the controller applies the touch input to an object displayed at a position corresponding to the corrected position information of the touch input.

18. The device according to claim 1, wherein the controller changes a position of a displayed object when the flexible display unit is switched from the flat state to the bent state, and
    wherein the controller further corrects an error of the touch sensor unit due to change in the position of the object and an error of the touch sensor unit due to switching of the state of the flexible display unit.

19. The device according to claim 1, wherein the controller reduces the first distance when the touch input in contact with the flexible display unit is dragged from the first position toward a bending axis.

20. A control method of a flexible display device, the method comprising:
    sensing a state of the flexible display device;
    detecting touch input at a first position of the flexible display device;
    correcting position information of the touch input detected at the first position, to a second position when the flexible display device is in a flat state; and
    correcting the position information of the touch input detected at the first position, to a third position when the flexible display device is in a first bent state,
    wherein a first distance between the first position and the second position exceeds a second distance between the first position and the third position.

* * * * *